United States Patent Office 3,592,811
Patented July 13, 1971

---

3,592,811
2-HEXAFLUOROISOPROPYLIDENE-1,3-THIAZETI-
DINES AND THE PREPARATION THEREOF
Maynard S. Raasch, Wilmington, Del., assignor to E. I.
du Pont de Nemours and Company, Wilmington, Del.
No Drawing. Filed Aug. 9, 1967, Ser. No. 659,346
Int. Cl. C07d 85/04
U.S. Cl. 260—240     10 Claims

ABSTRACT OF THE DISCLOSURE

Fluorinated thiazetidines having selected substituents are produced by the reaction of bis(trifluoromethyl)thioketene with a carbodiimide or an azine at moderate temperatures. These products are surface treating agents for making textiles water repellent.

FIELD OF THE INVENTION

This invention relates to novel thiazetidines and to a process for the preparation thereof.

SUMMARY OF THE INVENTION

This invention is directed to a compound of the group consisting of (I) 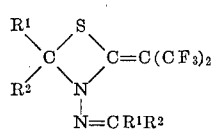

and (II) 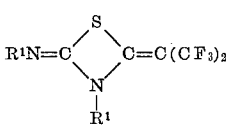

wherein:

(a) $R^1$, individually, can be the same or different and is alkyl, cycloalkyl, aralkyl, alkaryl, aryl or haloaryl of up to 10 carbons, the halogen being fluorine, chlorine or bromine;

(b) $R^2$, individually, can be the same or different and is hydrogen, alkyl, cycloalkyl, aralkyl, alkaryl, aryl or haloaryl of up to 10 carbons, the halogen being fluorine, chlorine or bromine; and (c) $R^1$ and $R^2$ attached to the same carbon, taken together, are an alkylene group of 4–5 carbons.

The process for producing the compounds of this invention comprises contacting, at temperatures of about 0–100° C., bis(trifluoromethyl)thioketene with a compound selected from the group consinting of

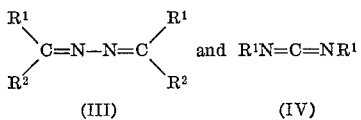

(III)     (IV)

wherein $R^1$ and $R^2$ are as defined above.

The products of this invention are useful as surface treating agents for making textiles water repellent.

DESCRIPTION OF THE PREFERRED EMBODIMENTS

The products of this invention are produced by the reaction of an azine (III) or carbodiimide (IV) with bis(trifluoromethyl)thioketene (V) producing (I) and (II), respectively as represented by the equations:

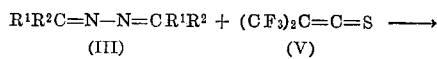

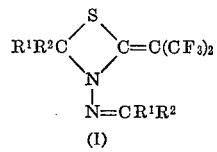

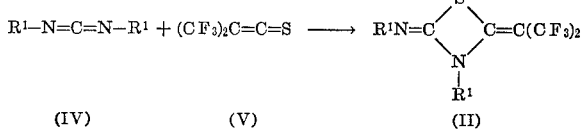

(IV)     (V)     (II)

The terms $R^1$ and $R^2$ in the above equations are defined to include alkyl groups such as methyl, ethyl, butyl, pentyl, octyl, decyl and the like; cycloalkyl groups such as cyclobutyl, cyclopentyl, cyclohexyl, cycloheptyl, cyclodecyl and the like; aralkyl groups such as benzyl, α-phenylethyl, β - phenylethyl, δ - phenylbutyl and the like; alkaryl groups such as o-tolyl, p-tolyl, 3,4 - dimethylphenyl, 4 - ethylphenyl, 4 - butylphenyl and the like; aryl such as phenyl, α-naphthyl and β-naphthyl; and haloaryl containing up to 5 halogen groups such as 4 - chlorophenyl, 4 - bromophenyl; 4 - fluorophenyl, 2 - chlorophenyl and 3 - chlorophenyl, 3,4 - dichlorophenyl, 2,4,5-trichlorophenyl, 3-chloro-4-bromophenyl and the like.

Both symmetrical and asymmetrical reactants, i.e., where each $R^1$ and $R^2$ group of the azine and the $R^1$ groups of the carbodiimide can be the same or different, can be used in the process of this invention to produce the corresponding thiazetidine products.

The reaction between bis(trifluoromethyl)thioketene and carbodiimides or azines is midly exothermic and proceeds at external temperatures as low as 0° C. or even lower. Moderate heating, e.g., up to 100° C. can be used if desired to complete the reaction. A convenient range of reaction temperature is 0–50° C. since the thioketene boils at 52° C. Although the reaction can be carried out without a solvent in some cases, it is usually desirable to use a solvent as either the starting carbodiimide or azine or the product can be a solid. Suitable inert solvents are the liquid hydrocarbons or halohydrocarbons such as hexane, cyclohexane, benzene, toluene, dichloromethane, carbon tetrachloride, dichlorotetrafluoroethane, 1,1,2 - trichloro - 1,2,2 - trifluoromethane, chlorobenzene and the like. Carbon disulfide can also be used. The reaction may be carried out in a batch process, as illustrated by the examples, or the reactants may be passed through a tube or other vessel in a continuous process.

The relative proportions of the two reactants are not critical since the reaction will proceed to some extent when either is present in excess. The best results are generally obtained by using equimolar amounts of the reactants.

The reaction product can be purified by conventional methods such as crystallization, or distillation under reduced pressure.

The starting materials used in the process of this invention have been reported in the literature. Bis(trifluoromethyl)thioketene is described in U.S. Pat. 3,275,609 to M. S. Raasch. Carbodiimides and azines are well-known classes of compounds. The preparation of carbodiimides has been reviewed by Kurzer and Douraghi-Zadeh, Chem. Rev., 67, 107 (1967).

Symmetrical azines are produced by the reaction of an aldehyde or a ketone with hydrazine in a mildly basic medium. Asymmetrical azines can be produced by the reaction of an aldehyde hydrazone or a ketone hydrazone with another aldehyde or ketone.

Other azines and carbodiimides can be produced by the methods described above.

The invention is illustrated by the following examples in which pressure is expressed as mm. of mercury unless otherwise stated.

Example 1.—2-hexafluoroisopropylidene-3-p-tolyl-4-p-tolylimino-1,3-thiazetidine

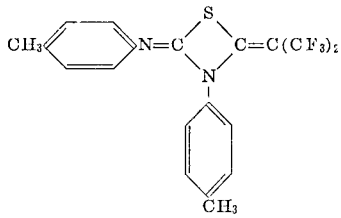

To 6.66 g. (0.03 mole) of di-p-tolylcarbodiimide in 25 ml. of dichloromethane was added 6 gr. (0.03 mole) of bis(trifluoromethyl)thioketene and the solution was allowed to stand for 16 hours. The solvent was allowed to evaporate, and the crystalline residue was recrystallized from methanol to give 10.6 g. (85% yield) of the thiazetidine, M.P. 83–84° C.

Analysis.—Calcd. for $C_{19}H_{14}F_6N_2S$ (percent): C, 54.80; H, 3.39; S, 7.70; M.W. 416. Found (percent): C, 55.00; H, 3.42; S, 7.73; M.W., 371.

The infrared spectrum showed absorption at 5.77μ (C=N) and 6.14μ (exocyclic C=C). Heating the compound at 240° C. for 10 minutes produced p-tolyl isothiocyanate, which is further evidence for the structure.

Example 2.—2-hexafluoroisopropylidene-3-isopropyl-4-isopropylimino-1,3-thiazetidine

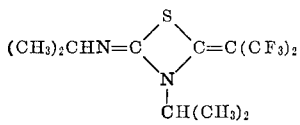

Bis(trifluoromethyl)thioketene was added dropwise to an equimolar amount of diisopropylcarbodiimide with stirring and cooling in ice. Reaction took place quickly. Distillation gave an 88% yield of the thiazetidine, B.P. 47–48° C./0.15 mm., $n_D^{25}$ 1.4450.

Analysis.—Calcd. for $C_{11}H_{14}F_6N_2S$ (percent): C, 41.25; H, 4.41; S, 10.01. Found (percent): C, 41.42; H, 4.46; S, 10.50.

Example 3.—2-hexafluoroisopropylidene-3-cyclohexyl-4-cyclohexylimino-1,3-thiazetidine

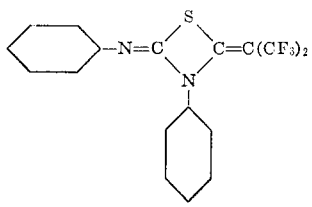

Dicyclohexylcarbodiimide (2.06 g., 0.01 mole) in 10 ml. of petroleum ether was kept at 10–15° C. while 2.35 g. (0.012 mole) of bis(trifluoromethyl)thioketene was added dropwise with stirring. The solvent was evaporated off and the product was recrystallized from methanol to give 3.68 g. (92% yield) of the thiazetidine, M.P. 56–56.5° C.

Analysis.—Calcd. for $C_{17}H_{22}F_6N_2S$ (percent): C, 50.41; H, 5.54; S, 8.01. M.W. 400. Found (percent): C, 49.91; H, 5.28; S, 7.85. M.W. 375.

The infrared spectrum showed absorption at 5.72μ (C=N) and 6.15μ (exocyclic C=C).

Example 4.—2-hexafluoroisopropylidene-3-benzalamino-4-phenyl-1,3-thiazetidine

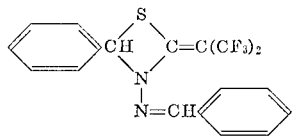

To 5.24 g. (0.025 mole) of benzalazine in 50 ml. of benzene was added 4.85 g. (0.025 mole) of bis(trifluoromethyl)thioketene and the solution was allowed to stand for 16 hours. The benzene was allowed to evaporate and the residue was washed with petroleum ether until free of benzalazine. The white crystals remaining were recrystallized from methanol to give 1.6 g. (19% yield) of the thiazetidine, M.P. 136–138° C.

Analysis.—Calcd. for $C_{18}H_{12}F_6N_2S$ (percent): C, 53.74; H, 3.01; S, 7.97. M.W. 402. Found (percent): C, 53.84; H, 3.05; S, 7.73. M.W. 369.

Example 5.—2-hexafluoroisopropylidene-3-cyclohexylideneamino-4-pentamethylene-1,3-thiazetidine

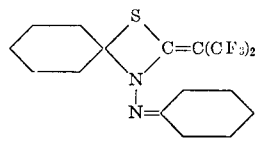

Cyclohexanoneazine (5.78 g., 0.03 mole) was dissolved in 25 ml. of petroleum ether and stirred at 10–15° C. Bis-(trifluoromethyl)thioketene (8.0 g., 0.041 g.) was added dropwise. The solvent was allowed to evaporate and the residue was washed with cold methanol to leave 5.5 g. (38% yield) of the thiazetidine. After recrystallization from nitromethane it melted at 99.5–100.5° C.

Analysis.—Calcd. for $C_{16}H_{20}F_6N_2S$ (percent): C, 49.72; H, 5.22; S, 8.30. Found (percent): C, 49.65; H, 5.11; S, 8.29.

By applying the above-described procedures of Examples 1–5 to the reaction of bis(trifluoromethyl)thioketene with other carbodiimides and azines, other hexafluoroisopropylidene-1,3-thiazetidines of this invention are similarly obtained. Thus, from carbodiimides,

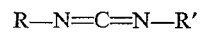

are produced 1,3-thiazetidines of the formula

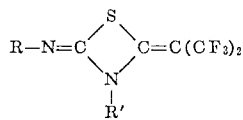

where R and R' may be the same or different and, as illustrative examples, may be such radicals as methyl, isobutyl, 1,1,3,3-tetramethylbutyl, octyl, decyl, cyclopentyl, methylhexyl, cyclohexanebutyl, cyclooctyl, benzyl, 2,4-dichlorobenzyl, phenethyl, phenylbutyl, mesityl, butylphenyl, bromophenyl, and fluorophenyl. When R and R' are different, two isomeric 1,3-thiazetidines are generally produced, as addition of the bis(trifluoromethyl)thioketene may take place at either of the two double bonds. Similarly, in production of 1,3-thiazetidines of the type

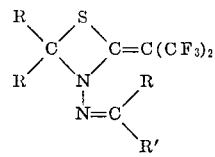

from azines of the formula RR'C=N—N=CRR', R and R' may be again as examples, the radicals listed above, and in addition, one or both of the R's may be hydrogen.

The foregoing examples illustrate some representative compounds obtainable by the process of the invention.

The described procedure is applicable to the preparation of other thiazetidines of this invention.

All the compounds of this invention are useful for improving the properties of wool, particularly its water repellency. For this use the thiazetidines derived from azines are preferred. Thus, the fabric is dipped in a 5% solution of the thiazetidines of Examples 4 and 5 in a solvent such as dichloromethane, dried, baked at 100–130° C. for 30 minutes, and then washed with a solvent such as trichloroethylene. Beads of water placed on the treated fabric do not soak in as they do with untreated fabric. Thiazetidines derived from carbodiimides generally require a higher baking temperature.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound of the group consisting of

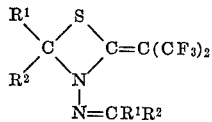

and

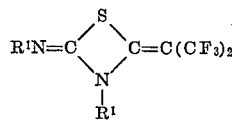

wherein:
(a) the R¹ groups can be the same or different and, individually, are alkyl, cycloalkyl, aralkyl, alkaryl, aryl or haloaryl of up to 10 carbons, the halogen being fluorine, chlorine or bromine;
(b) the R² groups can be the same or different and, individually, are hydrogen, alkyl, cycloalkyl, aralkyl, alkaryl, or haloaryl of up to 10 carbons, halogen being fluorine, chlorine or bromine; and
(c) R¹ and R² attached to the same carbon, taken together, are an alkylene group of 4 to 5 carbons.

2. A compound of claim 1 of the formula

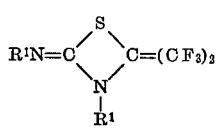

wherein R¹ is as defined in claim 1.

3. A compound of claim 1 of the formula

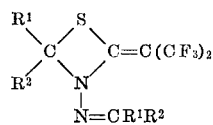

wherein R¹ and R² are as defined in claim 1.

4. The compound of claim 2 wherein R¹ is 4-tolyl; said compound being 2-hexafluoroisopropylidene-3-p-tolyl-4-p-tolyimino-1,3-thiazetidine.

5. The compound of claim 2 wherein R¹ is isopropyl; said compound being 2-hexafluoroisopropylidene-3-isopropyl-4-isopropylimino-1,3-thiazetidine.

6. The compound of claim 2 wherein R¹ is cyclohexyl; said compound being 2-hexafluoroisopropylidene-3-cyclohexyl-4-cyclohexylimino-1,3-thiazetidine.

7. The compound of claim 3 wherein R¹ is phenyl and R² is hydrogen; said compound being 2-hexafluoroisopropylidene - 3 - benzalimino - 4 - phenyl - 1,3-thiazetidine.

8. The compound of claim 3 wherein R¹ and R² together are pentamethylene; said compound being 2-hexafluoroisopropylidene - 3 - cyclohexylidene-amine-4-pentamethylene-1,3-thiazetidine.

9. The process for preparing a compound of claim 1, which comprises contacting at about 0–100° C. bis(trifluoromethyl) thioketene with a compound of the group consisting of

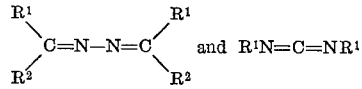

wherein R¹ and R² are as defined in claim 1.

10. The process of claim 9, which is carried out at a temperature of about 0–50° C.

References Cited

Karrer: Organic Chemistry, 4th English ed., p. 928 Elsevier Pub. Co. (N.Y.) 1950.

Chemical Abstracts (I) vol. 57, col. 8425 (1962) (abstract of Dovlatyan et al.).

Chemical Abstracts (ii) vol. 57, 2479s (subject index), 1962.

Will, Ber. Deut. Chem. vol. 14, p. 1486 (1881).

Eilingsfeld etal., Chem. Ber. vol. 97, p. 1234 (1964).

Ulrich et al. I, Tethedron, vol. 22, pp. 1565 to 1573 (1966).

Ulrich et al. II, Angew. Chem. Internat. Edit., vol. 5, pp. 704 to 712 (1966).

JOHN D. RANDOLPH, Primary Examiner

U.S. Cl. X.R.

8—128; 117—135.5, 140; 260—327